H. S. NICHOLS.
Interfering Pads for Horses.

No. 162,251. Patented April 20, 1875.

Witnesses.
S. N. Piper
L. N. Koller

Henry S. Nichols
by his attorney
R. H. Eddy

UNITED STATES PATENT OFFICE.

HENRY S. NICHOLS, OF LYNN, MASSACHUSETTS.

IMPROVEMENT IN INTERFERING-PADS FOR HORSES.

Specification forming part of Letters Patent No. 162,251, dated April 20, 1875; application filed March 3, 1875.

*To all whom it may concern:*

Be it known that I, HENRY S. NICHOLS, of Lynn, of the county of Essex and State of Massachusetts, have invented a new and useful Improvement in Horseshoes; and do hereby declare the same to be fully described in the following specification and represented in the accompanying drawings, of which—

Figure 1:
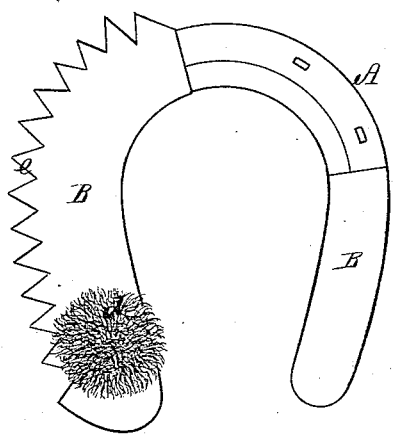
Figure 2:
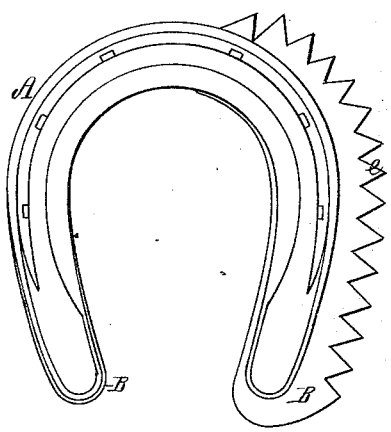
Figure 3:
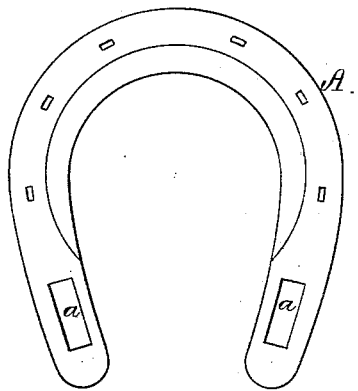
Figure 4:
Figure 5:
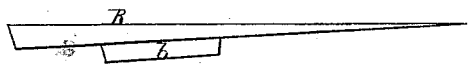
Figure 6:
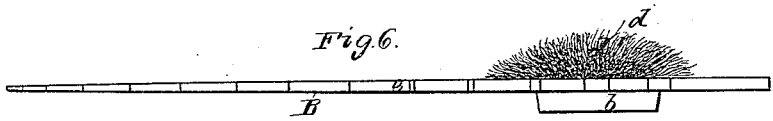

Figure 1 is a top view, and Fig. 2 a bottom view, of a horseshoe provided with my invention. Fig. 3 is a top view of the shoe without the heel-cushions. Fig. 4 is a transverse section of the shoe, going through its heel-mortises. Figs. 5 and 6 are edge views of the heel-cushions.

The shoe, as hereinafter described, is provided with a peculiar elastic cushion, arranged to project from it beyond its outer edge, or back from its heel, or both, and such, besides being held in place by the coupling-nails of the shoe, has a projection, to enter a mortise or recess in the shoe, the object of such projection and mortise being to keep the heel-cushion, whether it be of leather or vulcanized rubber, from working laterally out of place, especially when it is projected beyond the edge of the shoe, and provided with teeth, as shown. Such teeth, by sticking against the opposite hoof or leg of a horse to that on which the cushion may be fixed, was very liable to displace the cushion.

In the drawings the horseshoe is shown at A, with a mortise or recess, *a*, in its upper surface near each brace, the yielding cushion being shown at B as provided with a tenon or projection, *b*, to enter and fill or nearly fill such mortise or cavity *a*. The said tenon I usually compose of a piece of sole-leather sewed directly to the under side of the cushion. When the horse to wear the cushion between the hoof and the shoe has a corn, I generally fix to the cushion a reliever or mass, *d*, of threads of flax or cotton, such as will spread and fit to the diseased part, and relieve it from pressure of the shoe. Furthermore, should the animal interfere in going, the heel-cushion may be projected laterally beyond the shoe, and be serrated or toothed, as shown at *e*. The cushion may also be extended a short distance in rear of the heel of the shoe, in order that, should the horse overreach, the projecting part of the cushion, rather than the heel of the fore shoe, may be struck by the rear shoe, and, as a consequence, the fore shoe be saved from being loosened by the blow.

I would remark that my invention applies as well to shoes for asses and mules as those for horses.

I do not claim a pad or cushion provided with a round piece or projection, to enter a corresponding recess in a shoe, all being as shown in the United States Patent No. 110,828. Nor do I claim a pad composed of a layer of leather and one of equal size of felt, as shown in the United States Patent No. 73,050, as the corn-reliever I use with the pad is a mass of threads or cotton, to extend little, if any, beyond the corn, and constructed so as to fit and adapt itself thereto. It is arranged over the projection *b*, whereby it becomes supported and held in place, and is constructed to operate to better advantage than it would without such projection and its receiving-cavity.

I claim as my invention as follows, viz:

1. In a horseshoe provided with the heel-recess *a* and the elastic cushion B, having a tenon or projection, *b*, to enter such recess, the said elastic cushion arranged to project in rear of or beyond the heel of the shoe, as and for the purpose specified.

2. The elastic cushion B, provided with the projection *b*, and with the corn-reliever *d*, constructed and arranged with such projection as represented.

3. The elastic cushion, provided with the range of teeth in its outer edge, and extended over the upper surface of the shoe, and beyond its outer edge, and provided with a projection, *b*, extended into a corresponding recess or mortise in the shoe, all being as shown and described.

HENRY S. NICHOLS.

Witnesses:
R. H. EDDY,
J. R. SNOW.